United States Patent [19]

Clifford

[11] Patent Number: 5,080,632
[45] Date of Patent: Jan. 14, 1992

[54] LEG TRANSFER MACHINE FOR POULTRY PROCESSING SYSTEM OR THE LIKE

[75] Inventor: Glenn A. Clifford, Bentonville, Ark.

[73] Assignee: Artran, Inc., Springdale, Ark.

[21] Appl. No.: 553,231

[22] Filed: Jul. 16, 1990

[51] Int. Cl.⁵ ............................................. A22C 21/00
[52] U.S. Cl. ..................................... 452/182; 452/167
[58] Field of Search ............... 452/182, 183, 177, 170, 452/165, 166, 167

[56] References Cited

U.S. PATENT DOCUMENTS

| | | | |
|---|---|---|---|
| 4,178,659 | 12/1979 | Simonds | 452/182 |
| 4,709,448 | 12/1987 | McGuire et al. | 452/182 |
| 4,813,101 | 3/1989 | Brakels et al. | 452/182 |
| 4,896,399 | 1/1990 | Hazenbroek | 452/167 |
| 4,939,813 | 7/1990 | Hazenbroer | 452/167 |

*Primary Examiner*—Willis Little
*Attorney, Agent, or Firm*—Robert R. Keegan

[57] ABSTRACT

There is disclosed a leg transfer machine for unloading backs of chickens from a shackle conveyor and feeding the back of the chicken carcass into a conventional chicken leg processor. The machine is positioned under a shackle conveyor and includes an air cylinder-actuated rod positioned to strike both legs of the bird carcass just below the hocks and lift the hocks out of the shackle loop. A slotted guide receives the legs in respective slots with the hocks above the slots preventing the half of the chicken from dropping in an uncontrolled manner. A rake actuatable both vertically and horizontally is controlled to drop in front of the hocks and rake the legs back in the slots while generally vertical rail members contact the crotch of the chicken to cause the legs to extend horizontally as they descend onto an upwardly convex saddle element covering the end portion of the leg processing machine chain conveyor. A preferred embodiment has a second rake vertically oriented to forcibly slide the hocks down in the vertical extensions of the leg receiving slots. An air cylinder-operated pusher pushes the back of the chicken into engagement with the chain conveyor aided by a presser bar positioned to press down on the back as it moves under the impetus of the pusher bar. Stirrups on the side of the saddle element aid in centering the back half of the chicken on the saddle. The electrical control system includes detectors for presence of a shackle at the machine position and for the presence of a bird carcass on the shackle, and includes selector means for unloading every bird, second bird or third bird and thus several leg transfer machines may feed respective chicken leg processors from a single shackle conveyor.

20 Claims, 9 Drawing Sheets

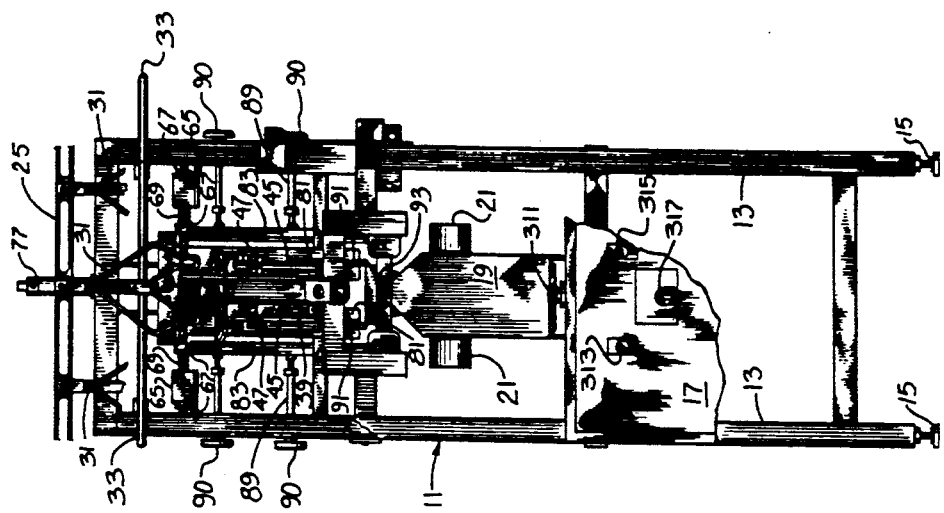

LEG TRANSFER MACHINE FOR POULTRY PROCESSING SYSTEM OR THE LIKE

The present invention relates to material handling machines and specifically for such machines used in poultry processing for handling chicken carcasses or parts thereof. It is a common expedient in the poultry processing industry to transport chicken carcasses on an apparatus known as a shackle conveyor which typically involves an endless conveyor chain at an elevated height from which are suspended a multitude of shackles spaced apart by about a foot and no less than six inches. The shackles typically are formed from metal rod and have a pair of U-shaped depending portions large enough to receive the chicken leg bones and small enough to keep the hocks of the chicken legs from passing through, thereby providing a temporary holder for a chicken carcass or legs portion suspended therefrom.

Some operations can be performed on the chicken carcass while it is suspended on the shackle of a shackle conveyor, but certain other processes are performed by machines or by the aid of machines which require that a portion of the carcass, for example the legs and saddle, be conveyed legs down on a chain conveyor with one leg on either side thereof. It has been customary to employ hand labor to transfer the chicken carcasses from a shackle conveyor to a chain belt conveyor, of a chicken leg processor for example. So far as is known, there has been no machine which would successfully automate this transfer of the saddle and legs portion of the chicken carcass from the shackle conveyor to a chain belt conveyor with the chicken half accurately located on the chain belt conveyor as required to properly carry out further operations.

The present apparatus deals with this problem in a very effective manner by lifting the hocks out of the shackle loop and disposing the legs in respective guide slots with the hock above the slot and thereafter actuating one or more mechanical rake mechanisms to draw the hock ends of the legs through the slots into a position on either side of a chain belt conveyor.

The present system also provides for unloading carcasses from a single shackle conveyor sequentially onto a plurality of chain belt conveyors. Machines fed by the chain belt conveyors may have a limited capacity and, with the present system, the combined capacity of several of such machines may be utilized in conjunction with one shackle conveyor whereby the shackle conveyor may be operated at a higher piece rate. There are also provisions for dealing with empty shackles and for taking one of several associated leg transfer machines out of service and instructing others of the machines to take up the work load.

The full function performed by the apparatus of the present invention is not believed to have been successfully accomplished by prior devices. Of course, prior devices have been known that mechanically lift the hocks of a chicken carcass out of the shackles of a shackle conveyor and let them drop on a belt conveyor or other receiving means. Such devices do not control the orientation of the chicken carcass and would be quite unsuitable for the function performed by leg transfer machines of the present invention.

In addition to providing the above features and advantages, it is an object of the present invention to provide a leg transfer machine for removing a portion of a chicken carcass from a shackle conveyor in a controlled manner and reorienting the carcass to reside legs down on the input to a chain belt conveyor with the saddle of the carcass overlaying the chain belt conveyor and each leg and thigh of the carcass on a respective side of the conveyor.

It is another object of the present invention to provide a leg transfer machine for removing chicken carcasses or parts thereof from a shackle conveyor while a shackle is in motion by striking each of the legs below the hock to deflect the hock upward and forward into a receiving slot on the machine where it is slidably retained and manipulated further by a rake mechanism to position the carcass in a desired position.

It is still another object of the present invention to provide a leg transfer machine for removing chicken carcasses or portions thereof from a shackle conveyor having object detection means for detecting the presence of a carcass in passing shackles, for counting the carcasses, and for selectively initiating the action of the striking bar that causes the hocks to be ejected from the shackle.

It is yet another object of the present invention to provide a leg transfer machine for removing chicken carcasses or portions thereof from a shackle conveyor which is controllable selectively to remove every second or third carcass while allowing others to pass, thereby permitting two or more such machines in series to transfer substantially equal shares of the carcasses passing along a shackle conveyor line.

Other objects and advantages of the present invention will be apparent from consideration of the following description in conjunction with the appended drawings in which:

FIG. 5 is a side elevational view of the leg transfer machine;

FIG. 6 is a front elevational view of the leg transfer machine;

Figure 1:
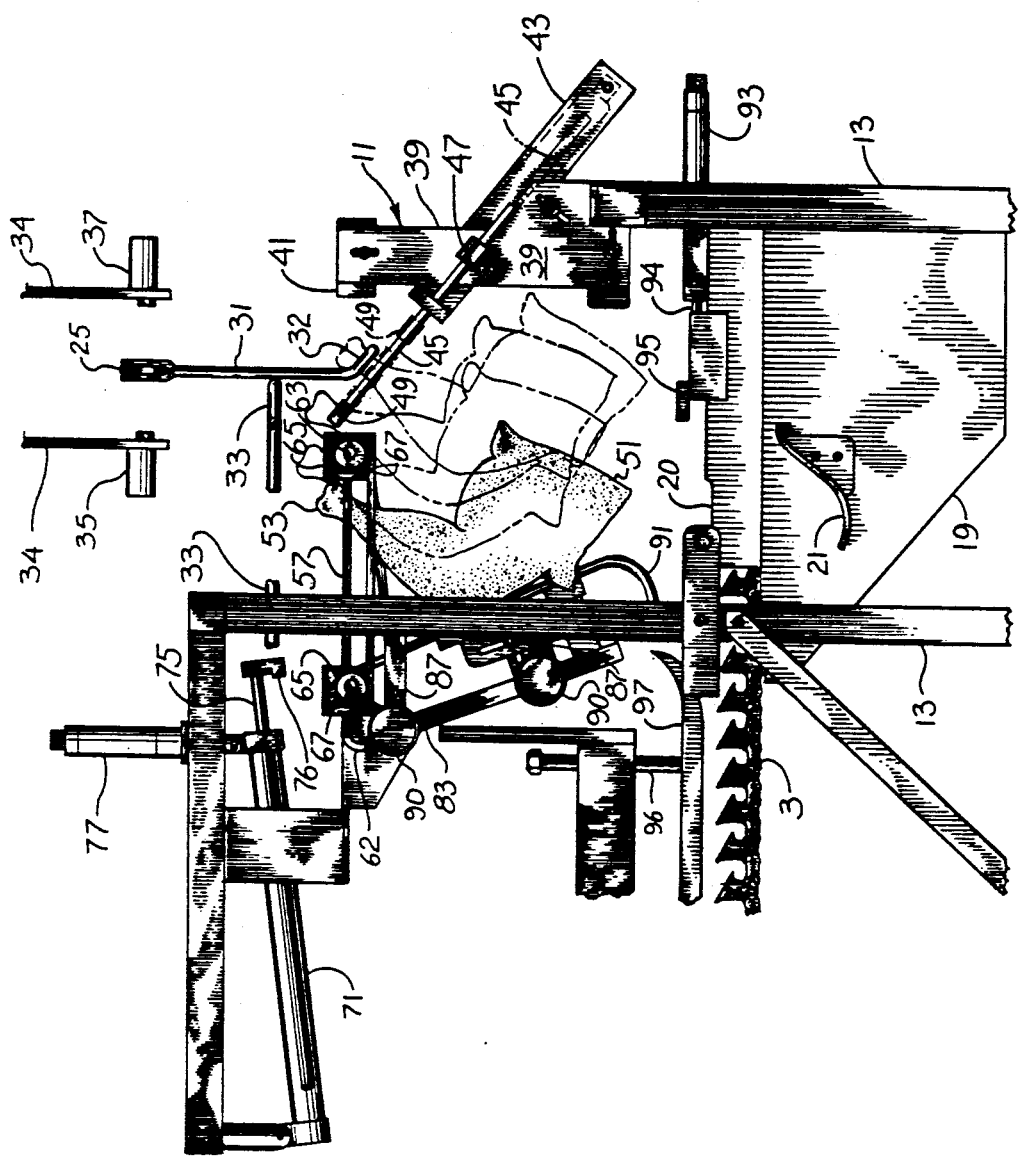
FIG. 1 is a fragmentary, side elevational view showing a leg transfer machine according to the invention at one stage of operation.

Referring now to the drawings, and particularly FIGS. 1 through 6, a leg transfer machine 11 is shown with four uprights 13 each having leveling feet 15 to level machine 11 at the proper height to cooperate with the next machine in the processing line and also to cooperate with the shackle conveyor from which it removes the chicken legs and back portions. By way of example, the next machine in the processing line may be a chicken leg processor of the sort manufactured by the Kraft Equipment Co., Lancaster, Pa. That machine forms no part of the present invention and only the chain belt conveyor 3 belonging to the chicken leg processor machine is shown to illustrate the manner of cooperation between the two machines.

Leg transfer machine 11 is provided with a control box 17 containing various electrical and pneumatic control elements later to be explained. The end loop of chain belt 3 and the return sprocket therefor (not shown) resides within a sheet metal cover forming a saddle element 19. A slot 20 in the saddle element 19 exposes the toothed chain belt 3 for engagement with a chicken carcass portion.

Saddle element 19 is also provided with a stirrup element 21 which causes bird carcass portions descending to the saddle to be better centered with the legs extending equally on both sides and also prevents the bird carcass portions from sliding off the saddle before they are received onto the chain belt 3.

As best seen in FIG. 6 an endless conveyor 25 supporting a multiplicity of shackles 31 passes through the leg transfer machine; its direction of travel is from right to left in FIG. 6, and is perpendicular to the plane of the paper in FIGS. 1 through 5. The shackle conveyor itself forms no part of the present invention and is not described in detail. The leg transfer machine can be adjusted to cooperate with most common configurations of shackles, but in some cases it may be necessary to replace some of the shackles on a shackle line conveyor to assure uniformity and proper cooperation with the leg transfer machine. In FIGS. 1 through 5 only the shackle 31 presently being unloaded by the leg transfer machine 11 is shown for a clearer representation.

Figures 8, 9:
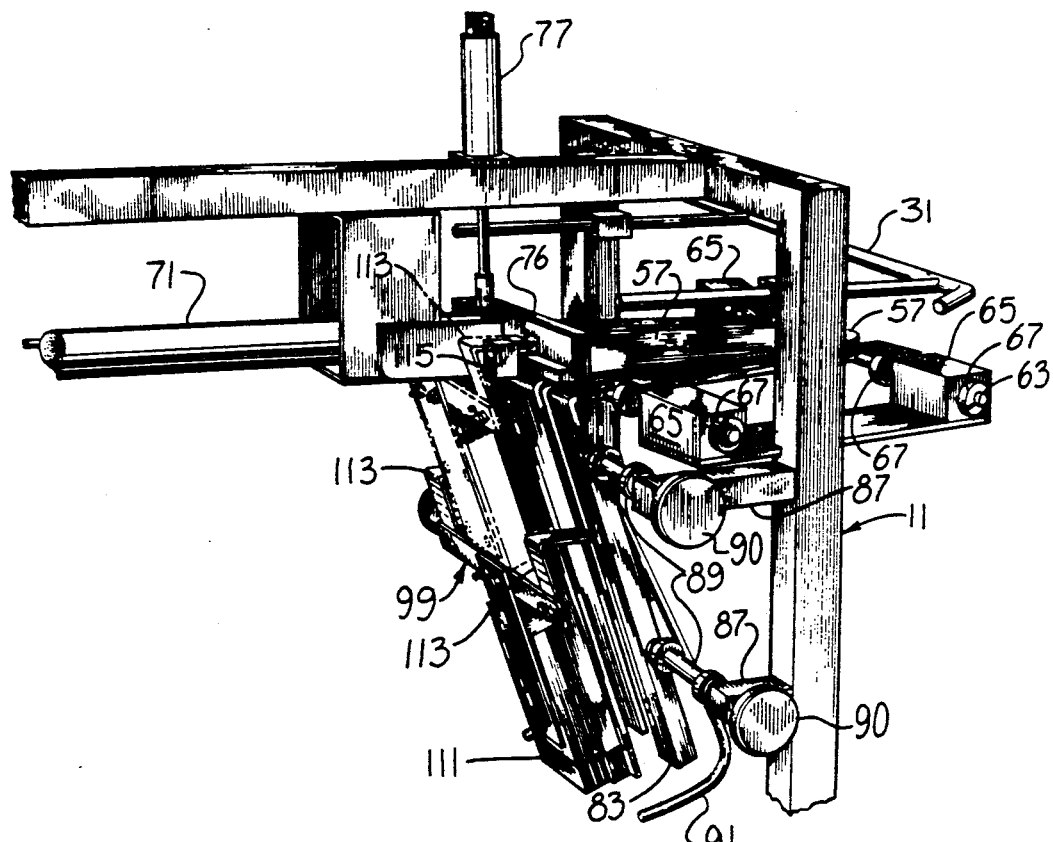
FIG. 8 is an enlarged isometric rear view showing an optional vertical rake unit for the machine.
FIG. 9 is an elevational rear view thereof.

A back-up bar 33 is mounted on the leg transfer machine 11. The configuration of the back-up bar is shown in FIGS. 5, 6 and 8, for example. As each shackle 31 approaches the leg transfer machine 11 from the left in FIG. 6 it is guided by curved end portions of the back-up bar 33 to the front of the bar sliding therealong in its passage through the leg transfer machine 11. The back-up bar 33 stabilizes the shackle 31 against swinging motion, particularly such motion transverse to the shackle conveyor line of travel.

The control system for the leg transfer machine 11 includes shackle detector units 35 and 37 mounted on a bracket 34. Detector units 35 and 37 may be optical beam detectors with the unit 35 being an emitter and unit 37 being a receiver or vice-versa. Alternatively an emitter and receiver may be positioned opposite a reflector or magnetic or physical detection means may be employed for use as a sensor to generate a signal in response to passage of a shackle 31 at a predetermined location. A brace 39 is mounted on the leg transfer machine 11 somewhat lower than the vertical elevation of the shackles 31, brace 39 supports an adjustably mounted optical detector 41 which, as later explained, signals the presence or absence of a bird carcass in a particular shackle passing through the leg transfer machine 11.

Figure 4:
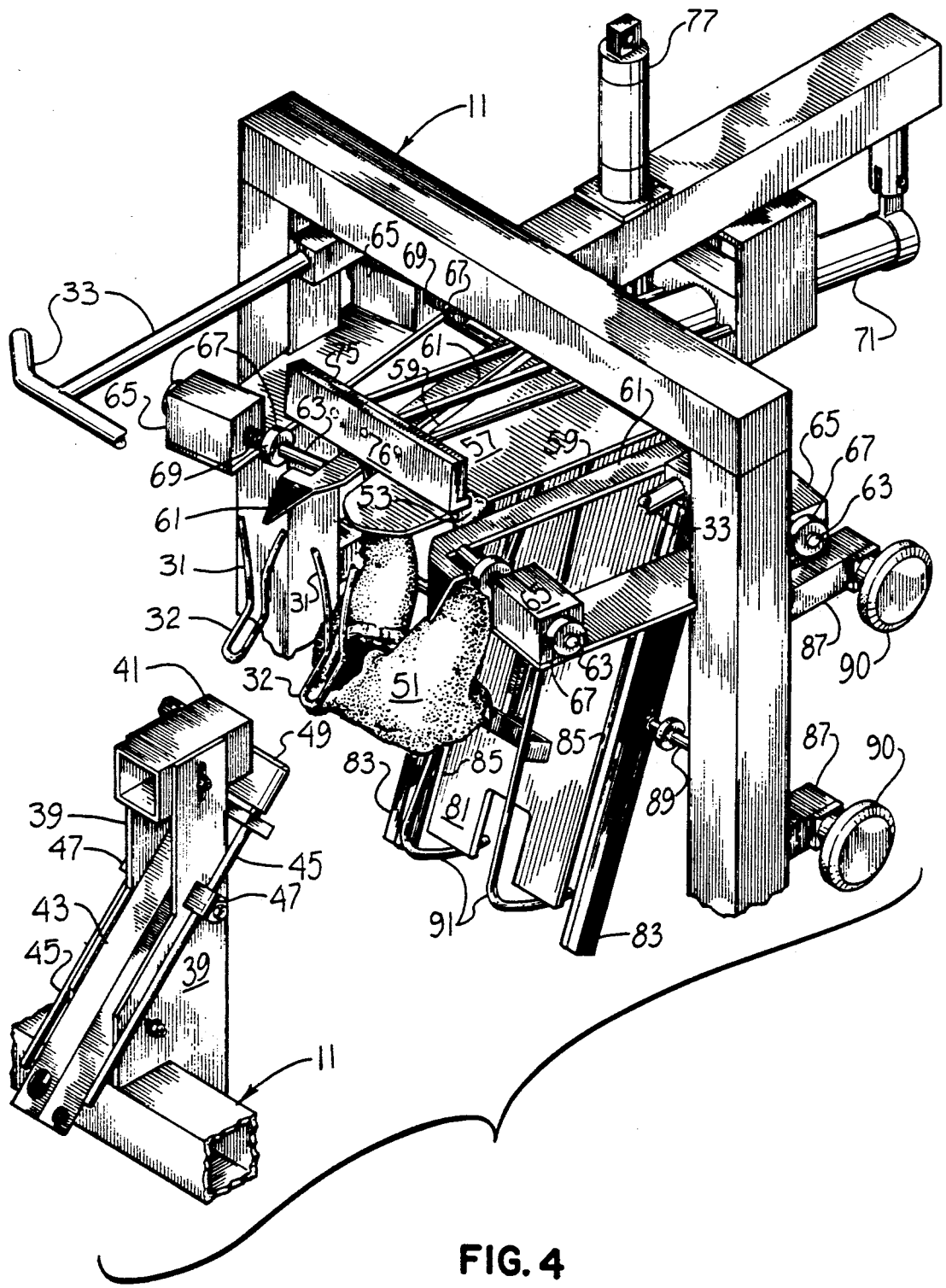
FIG. 4 is an isometric, fragmentary view of the hock-ejection portion of the machine.

Also supported on brace 39 is a pneumatic actuator 43 for actuating a thrust rod element 45 slidably mounted in guides 47, best seen in FIG. 4. On the upper end of thrust right element 45 is a striker 49 which is wide enough to span the distance between loops 32 of shackle 31 so that actuation of thrust rod element 45 by pneumatic actuator 43 causes striker 49 to impact on a chicken carcass 51 just below each of its hocks 53. Striker 49 may be formed of metal and/or plastic.

As seen in FIG. 1 the relation of thrust rod element 45 and striker 49 is adjusted with respect to the loops 32 of shackle 31 so that upon operation of actuator 43 chicken carcass 51 is struck just below each of its hocks 53, lifting the hocks out of loops 32 and into slots 59 of a guide 57. Keepers 61 forming a part of guide 57 are adjustable to change the width of slots 59. Shafts 63 which retain keepers 61 are slidably mounted in blocks 65, stop members 67 are threadedly mounted on shafts 63 so their position and hence the position of keeper 61 is adjustable. Preferably each keeper 61 is somewhat resiliently mounted by provision of springs 69 between inside stop element 67 and blocks 65 to accommodate substantial variation in the thickness of the legs of chicken carcasses 51 without adjustment of stop members 67. As seen in FIGS. 1 through 4 there are four slidable rods 63, blocks 65 and associated elements for each guide 57. Moderate variation in the size of birds being processed will be accommodated by the resilience of keepers 61 without the necessity for adjusting stops 67. If very small birds or if very large birds are to be processed, the adjustability of stops 67 will permit the slots 59 to be made wider or narrower so that the legs will enter the slots readily and yet the hocks 53 will not be able to slip through slots 59.

Figure 2:
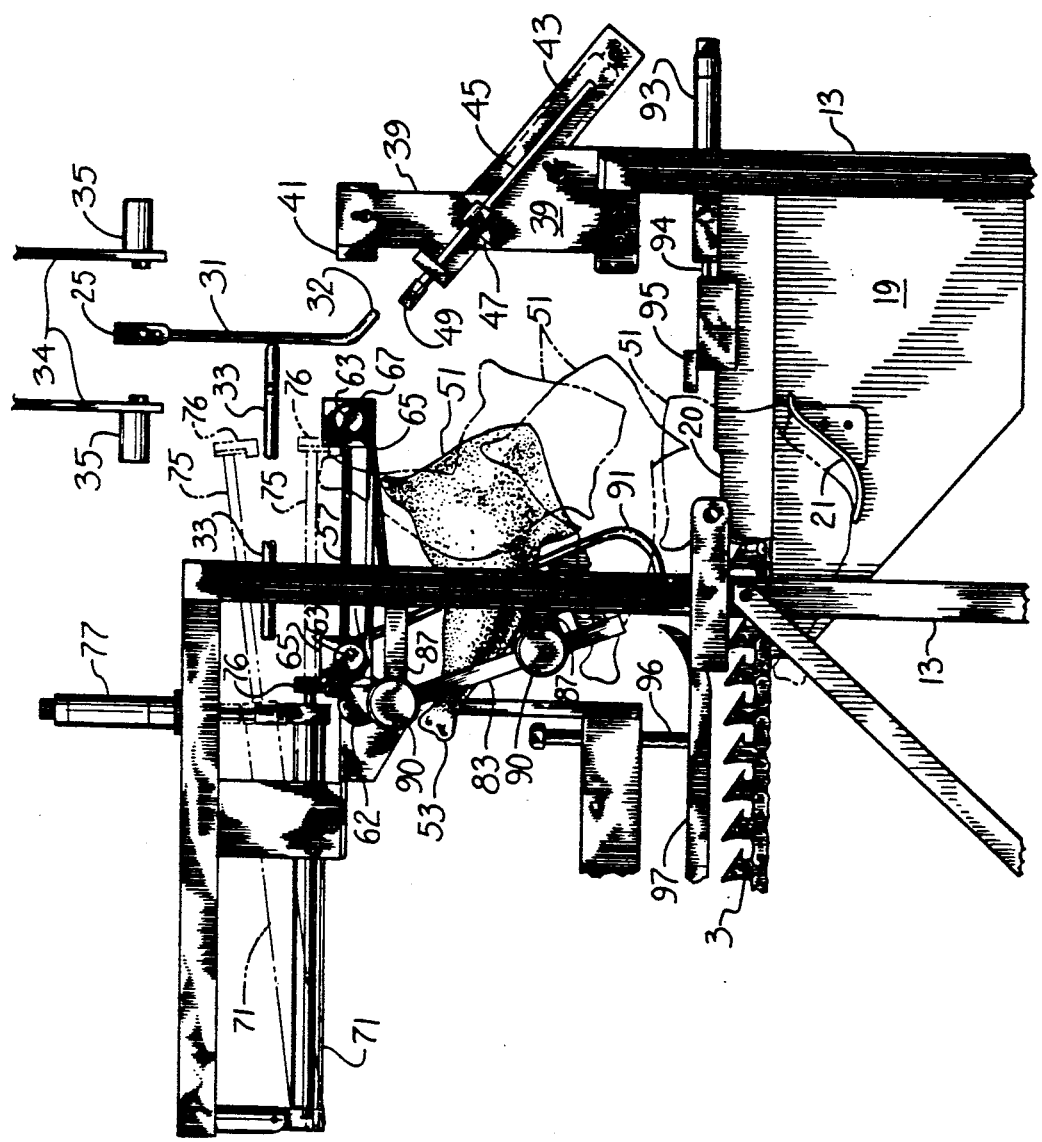
FIG. 2 is a similar view thereof showing the machine at a later stage of operation.

Mounted on leg transfer machine 11 is a pneumatic actuator 71 for actuating a rake 75 having a foot 76. In addition to pneumatic actuator 71 there is a vertically oriented pneumatic actuator 77 connected to the front of actuator 71 and arranged to lift rake 75 and foot 76 from a horizontal position to the position shown in FIG. 1. Referring to FIGS. 1 and 2, from a tilted retracted rest position generally as shown in FIG. 1 rake 75 is controlled by the control system and actuator 71 and 77 first to extend as shown in phantom lines in FIG. 2 by the action of pneumatic actuator 71 then to drop to a horizontal position also shown in phantom lines in FIG. 2 by extension of pneumatic actuator 77. Thereafter rake 75 is immediately moved to the left in FIG. 2 by retraction of pneumatic actuator 71 causing the hocks 53 of chicken carcass 51 to move through slots 59 to the rear edge of guide 57.

This sequence of operations for pneumatic actuator 71 and 77 is initiated by the control system immediately after the extension of pneumatic actuator 43 causes the hocks to be lifted out of loops 32 of shackle 31 and into the throats of slots 59.

The action of actuators 43, 71 and 77 described above takes place very quickly, in as little as about one second. The rest positions of pneumatic actuators 43, 71 and 77 are all the retracted positions to which the actuator return in preparation for commencement of another cycle of operation.

It will be noted that the apparatus shown in FIGS. 1 through 6 is provided with only a horizontal rake 75 although a preferred embodiment shown in FIGS. 8 and 9 also has an optional vertical rake unit 99. The immediately following description is of the apparatus shown in FIGS. 1 through 3 without the optional vertical rake unit 99, which will be described thereafter.

Referring to FIGS. 1 through 4 a vertical guide member 81 is mounted on leg transfer machine 11 slightly tilted from the vertical with the bottom end thereof somewhat forward of the top end and nearer the line of shackles 31. Vertical guide 81 is provided with vertical keepers 83 defining the outer edges of slots 85. Adjustment mechanisms for positioning keepers 83 are provided including mounting blocks 87, shafts 89 and rotatable knobs 90. The adjustment mechanism for vertical keepers 83 and for keepers 61 are generally conventional and any one of many suitable adjustment mechanisms could be substituted for the specific devices shown.

As seen in FIG. 2 keepers 62 have a downwardly curving portion 62 so that keepers 61 terminate with an extension that meets end to end with the top end of vertical keepers 83. In a similar fashion the rear end of guide 57 meets with the top end of vertical guide 81 with the result that slots 85 are essentially a continuation of slots 59.

Mounted in front of vertical guide 81 are a pair of vertical rails 91 which diverge slightly from each other from top to bottom and also diverge slightly from guide plate 81. For reasons that will later be more apparent rails 91 and slots 85 are positioned generally as the elements of the frustrum of a cone larger at the bottom than at the top. In fact rails 91 could be replaced by a sector of a frustrum of a cone forming a spine member. The principle purpose of rails 91 is to contact the crotch of the bird carcass and the insides of the thighs thereof, thereby causing the carcass to be turned from a legs up position to a legs forward position as hocks 53 travel along slots 59 and 85. The diverging or cone-like position of rails 91 relative to slots 85 causes the back and the meat at the crotch of the carcass 51 to be spread or flattened, thereby placing the carcass in an optimum configuration for placement on saddle 19 and chain belt 3.

Figure 3:
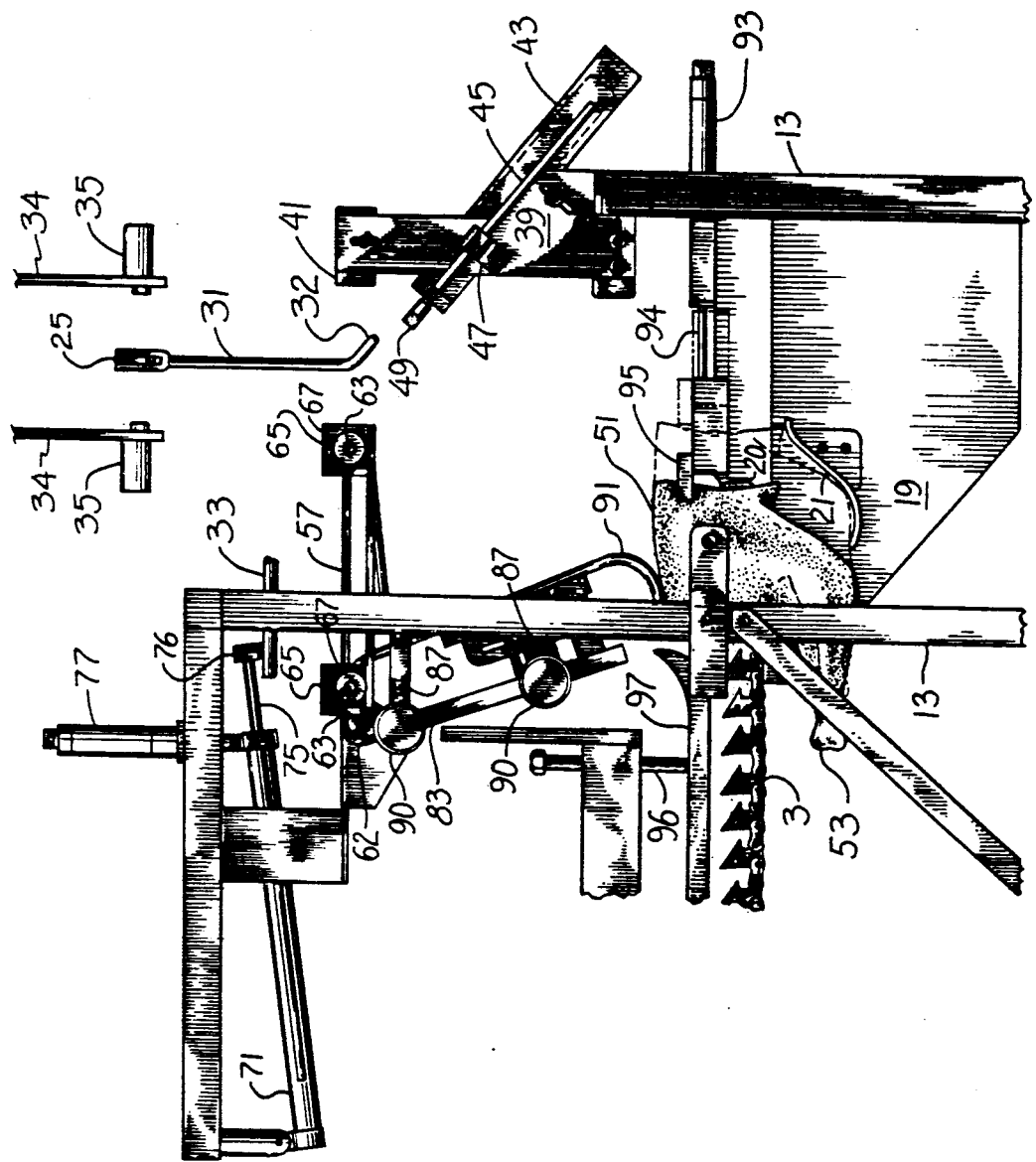
FIG. 3 is a similar view thereof showing the machine at a still later stage of operation.

Referring now particularly to FIG. 3 the position of chicken carcass 51 as it resides after hocks 53 have descended from the end of slots 85 is shown in phantom lines where the thighs and legs of the carcass will normally be resting on stirrups 21 while the back and crotch is widely spread on saddle 19.

A pneumatic actuator 93 is mounted with its actuator rod 94 substantially parallel to and in the same vertical plane as chain belt 3 of the chicken leg processor. As shown in FIG. 3 the pneumatic actuator 93 has started its travel causing pusher element 95 to force bird carcass 51 off of saddle 19 into the mouth of presser bar 97 at which point it is engaged by the teeth of chain belt 3 and is properly oriented for further processing in the chicken leg processing machine (not shown). An adjustment mechanism 96 for the presser bar 97 also is part of the chicken leg processing machine forming no part of the present invention.

The apparatus of FIG. 1 through 6 is fully operative and adequate for many purposes; however, a preferred embodiment of the leg transfer machine includes an optional vertical rake unit 99 as shown in FIGS. 8 and 9. The purpose of vertical rake unit 99 is to accelerate and aid the descent of the hocks captured in slots 85 as the bird carcass 51 is guided down along rails 91 onto saddle 19. The action of the vertical rake unit 99 obviates any problem that may occur with carcasses having abnormal or deformed legs or hocks and also allows the adjustment of vertical keepers 83 to be less critical. Consequently the variation in bird size and characteristics that may be handled is significantly increased by optional vertical rake unit 99. Rake unit 99 includes a pneumatic actuator 111 of the rodless type secured on the back side of guide 81. Actuator 111 has a rest position shown in phantom lines in FIG. 8 wherein fingers 113 secured on the rake unit are located substantially above the level of guide 57 whereby hocks 53 exiting the rear end of slots 59 pass under fingers 113. A pneumatic switch 115 is actuated when rake foot 76 fully retracts; pneumatic switch 115 produces a signal to cause downward motion of actuator 111 carrying fingers 113 down along slots 85 rapidly driving hocks 53 downward to a point where they fall by their momentum and by gravity from the ends of slots 85 in guide 81. The action of pneumatic actuator 111 is sufficiently forceful so that any tendency of the legs of the carcass to bind or jam in slots 85 will be overcome by the pressure of fingers 113. Apart from the improved reliability and the greater tolerance for bird size variation the operation of the preferred embodiment with optional vertical rake 99 is generally the same as previously described for the embodiment illustrated in FIGS. 1–6.

Figure 7:
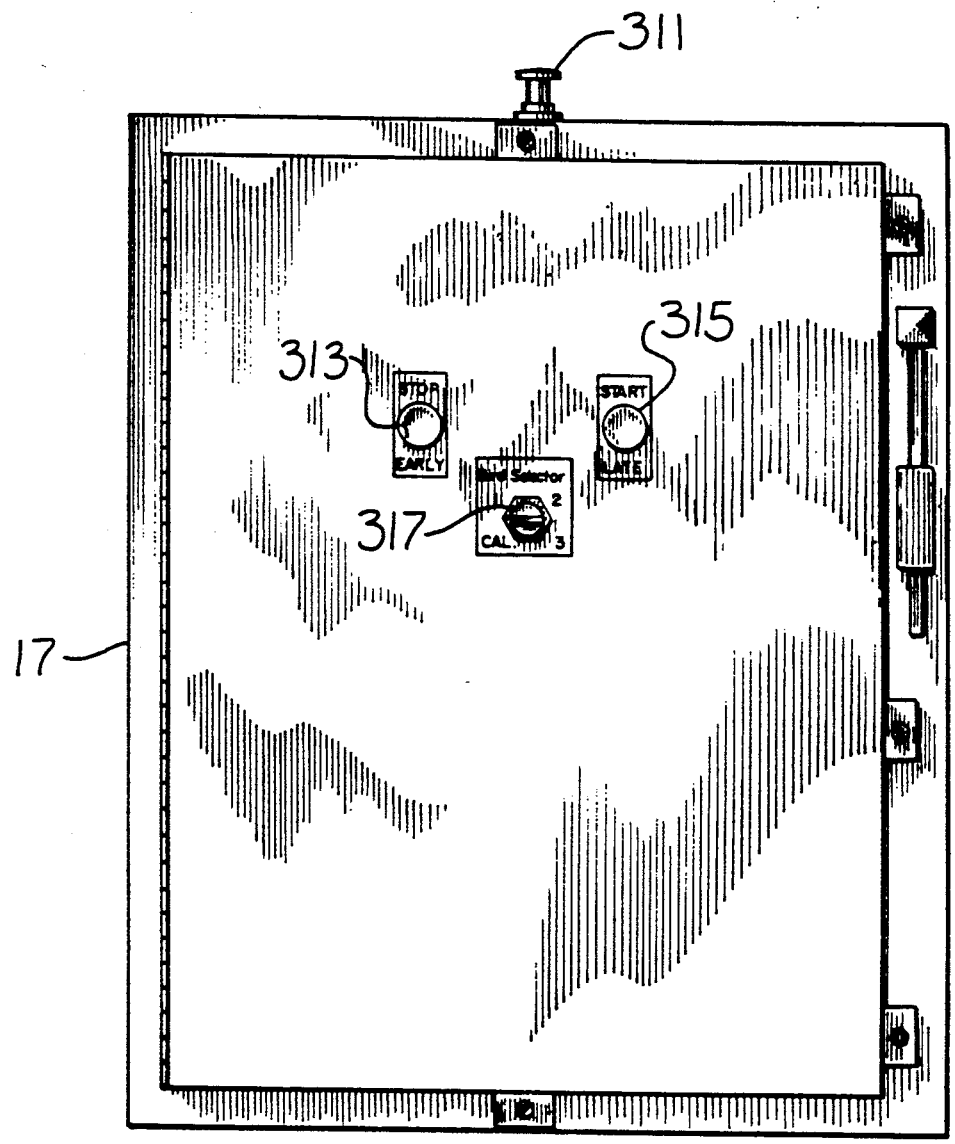
FIG. 7 is an enlarged front elevational view of the control cabinet and controls of the machine.

FIG. 7 shows the operator accessible controls for the leg transfer machine. On top of control box 17 is an emergency stop button 311. An electrical switch button 313 on the front of the control cabinet 17 is used to stop the normal operation of the machine, and for another purpose later described. The machine is started with a conventional electrical start control button 315, also having another purpose.

An electrical selector switch 317 marked "bird selector" has four positions marked "1", "2", "3", and "Cal." (for calibrate). As previously explained, the system has a capability of counting the shackles occupied by a bird carcass and transferring only every second carcass or every third carcass, and this function is selected by selector switch 317. Normally if there is only one leg transfer machine for a shackle line, switch 317 will be set on 1 and every shackle occupied by a bird carcass will be unloaded. If there are two leg transfer machines on a shackle line the last of the machines will have switch 317 set on 1 and will unload every occupied shackle, but the first machine will be set on 2 and will unload only every second shackle, thus sharing the work load between the two machines. In a similar fashion with three machines, the selector switch of the first machine will set on 3, of the second machine will be set on 2, and of the last machine will be set on 1. When three or more machines are sharing the work, it is generally possible to take one machine out of service and adjust selector switches to cause the remaining machines to share the load without exceeding their capacity. This facilitates maintenance or problem resolution without halting production.

The shackle detector units 35 and 37 shown in FIGS. 1–3 are preferably located slightly in advance of the center of leg transfer machine 11, and thus there is a slight time delay between detection of a shackle 31 and the commencement of the leg transfer cycle with the extension of thrust rod 45 by pneumatic actuator 43. Since the desired delay depends primarily on the speed of operation of the shackle line, over which the leg transfer machine has no control, provision is made for adjusting the delay by setting selector switch 317 on the "Cal." (calibrate) position. Electrical button switches 313 and 315 are used to correct timing by earlier or later operation of pneumatic actuator 43. In the preferred embodiment there are twenty steps of delay and each press of the red "early" button reduces delay by one step. Each press of the green "late" button increases delay by one step. This simple adjustment is all that is required by the operator to achieve and maintain properly timed operation of the leg transfer machines.

Figure 10:
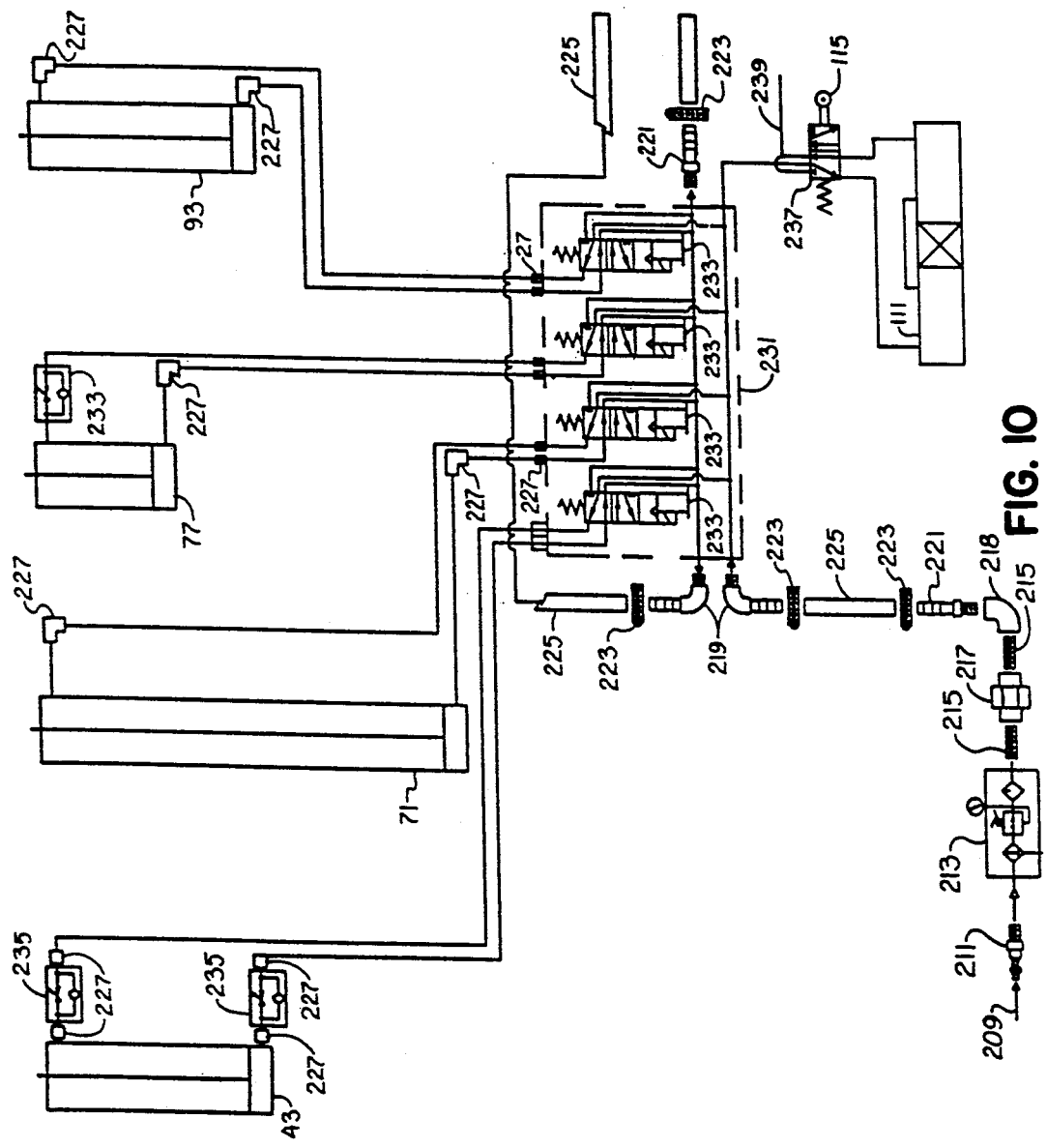
FIG. 10 is a schematic diagram of the pneumatic system for the machine.

FIG. 10 shows the pneumatic system for operation of the various pneumatic actuators in the leg transfer machine. A quick disconnect fitting 211 receives pressurized air from an air supply of approximately 85 psi which should be capable of supplying at least ten cubic feet per minute. A conventional filter regulator and lubricator unit 213 filters and regulates the pressurized air input which is connected by means of connectors and fittings 215, 217, 219 and 221 together with elbows 218 and clamps 22 to a pneumatic control unit 231 including a bank of four solenoid valves 233 in a conventional manner. Exhaust sides of solenoid valves 233 are also connected to the air system through fittings 219 and 221 together with clamps 223 and hose 225. Similar fittings are used in the remainder of the system as illustrated in FIG. 10 schematically, wherein elements 227 represent various forms of connectors of conventional form.

Each of the solenoid valves 233 is controlled by a respective electrical signal to cause extension or retraction of one of the pneumatic actuators 43, 71, 77, or 93 associated with the thrust rod, rake horizontal extension, rake lift, and pusher element respectively. Preferably actuator 43 is provided with flow control units 335 at both ports while actuator 77 is provided with a flow control unit 333 at its retract port. The use of such flow control units with pneumatic actuators is common and conventional and a greater number or lesser number of such units may be employed in the system as desired.

The rodless pneumatic actuator 111 for the vertical rake 99 is operated by an air operated valve 237 which is in turn operated by pneumatic switch 115 when it is contacted by foot 76 of horizontal rake 75.

While the pneumatic actuators specifically disclosed for operation of the leg transfer machine 11 are particularly effective in providing a reliable and durable system it will be appreciated that other forms of pneumatic or hydraulic actuator could be employed or in some instances electric solenoid or motor actuators could be used to carry out the operations previously described.

Figure 11:
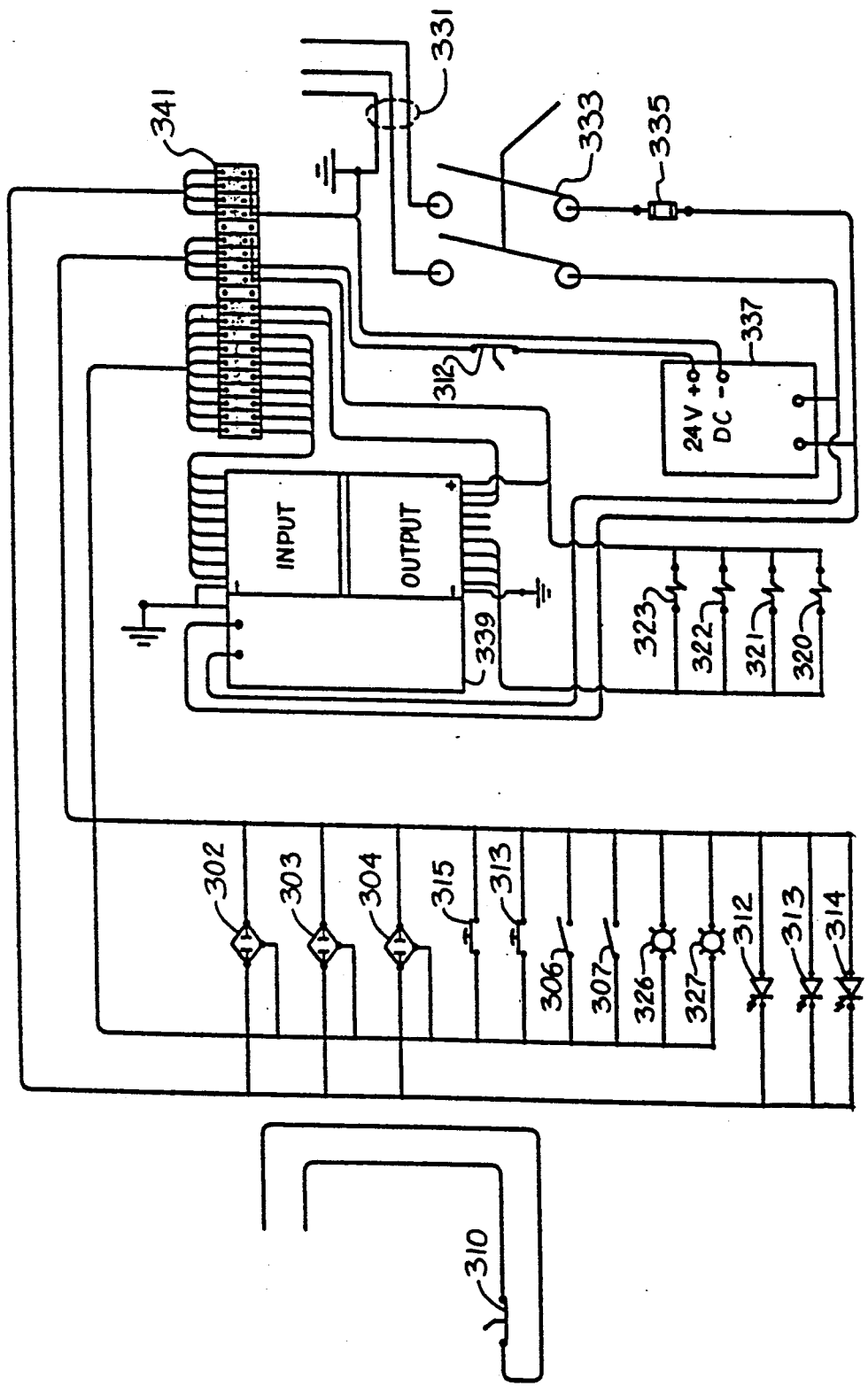
FIG. 11 is an electrical schematic diagram of the machine.

FIG. 11 shows the electrical system for the leg transfer machine 11, electrical power is provided through a conventional 110 volt ac power cable 331 to main switch 333 which is connected through a fuse 335 to a 24 volt dc power supply 337 and control unit 339. Inputs and outputs from control unit 339 are connected to a terminal block 341 from whence they are distributed to the electrical and electronic elements of the system. Inputs from photo sensor receivers 302, 303, and 304 respectively indicate shackle in position, bird on next shackle, and bird on conical rails. Photo sensor emitters 302', 303' and 304' are associated respectively with receivers 302, 303, and 304. Stop switch 313 also shown in FIG. 7 initiates a controlled stop at the end of a cycle of operation. Start switch 315 also shown in FIG. 7 starts the operation of control unit 339 and of leg transfer machine 11.

Switches 306 and 307 are associated with selector 317. Emergency stop switch 311 (shown in FIG. 7) has two poles indicated in FIG. 11 at 310 and 312. Single-pole switch 312 disables solenoid windings 320, 321, 322 and 323 thus deactivating pneumatic actuators 43, 71, 77 and 93. Single-pole switch 310 may be connected to shut off the leg processing machine which is associated with leg transfer machine 11 or any other subsequent machine with which the leg transfer machine is associated. Start switch 315 and stop switch 313 are preferably illuminated by lamps 327 and 326 which are controlled to provide the following indications to the operator. Conventionally the start lamp is green and the stop lamp is red. The green lamp on continuously signifies that the leg transfer machine is in run mode and ready to begin production. The red lamp on continuously signifies that the leg transfer machine is in stop mode and will not operate any cylinders. The red lamp flashing signifies that the leg transfer machine is in the automatic stop mode, and will complete a cycle before going into the stop mode.

Both red and green lamp flashing indicates that the leg transfer machine is in the calibration mode, ready to calibrate by adjusting delay to synchronize operation with the speed of the shackle line. Both red and green lamps off indicates that the leg transfer machine has no power, or the emergency stop is engaged. All above functions preferably are controlled by a programmed microcomputer in control unit 339, although separate timers, relays, and the like could be used to control the apparatus in accordance with known techniques.

In addition to the variations and modifications to the invention which have been shown, described or suggested above, persons skilled in the art will be aware of other variations or modifications that may be made to the disclosed apparatus and accordingly the scope of the invention is not to be considered limited to those embodiments or variations thereof shown or suggested, but is rather to be determined by reference to the appended claims.

What is claimed is:

1. Leg transfer apparatus for removing the legs and back portion of a bird carcass suspended by its hocks on a shackle line conveyor and guiding said legs and back portion to a chain belt conveyor comprising
    (a) a rod constrained to linear motion in an upward direction at an angle corresponding to the direction for release of bird hocks from a shackle of said shackle line conveyor,
    (b) means for reciprocating said rod in response to control signals,
    (c) a guide structure having a pair of generally parallel slots each arranged to receive a respective leg of said bird carcass with the hock thereof captured above a respective one of said pair of slots and extending away from said rod in a generally horizontal direction away from said shackle line conveyor,
    (d) a rake arranged above said guide structure slidably mounted for movement horizontally from a position near said shackle line conveyor to a position remote therefrom,
    (e) means for actuating said rake in response to control signals, and
    (f) an upwardly convex element adapted to receive said legs and back portion exiting descent from said slots remote from said rod with said legs resting respectively on opposite flanks of said convex element.

2. Apparatus as recited in claim 1 further including means for generating control signals to indicate the presence of a shackle arriving at the position of said thrust rod.

3. Apparatus as recited in claim 1 further including a vertical guide member having a pair of slots positioned to be a continuation of said pair of generally parallel slots for guiding said legs and back portion onto said upwardly convex element.

4. Apparatus as recited in claim 1 further including means for guiding and forcibly moving said hocks from the generally horizontally extending portion of said generally parallel slots in a descent to said upwardly convex element.

5. Leg transfer apparatus for removing the legs and back portion of a bird carcass suspended by its hock on a shackle of a shackle line conveyor and guiding said legs and back portion to a proper position on a chain belt conveyor of a chicken leg processor machine or the like comprising (a) a thrust rod mounted for linear motion in an upward direction and adapted to lift the legs of a bird to release engagement of the hocks thereof from a shackle, (b) means for actuating said thrust rod in response to control signals, (c) a guide structure having a pair of generally parallel slots spaced apart between about one to six inches, each with a throat portion arranged to receive a respective leg of said bird with the hock thereof above the slot, said pair of slots being adapted to capture said hocks and forming a track extending away from said thrust rod in a generally horizontal direction transverse to said shackle line conveyor and curving to a generally vertical downward direction at a portion remote from said thrust rod, (d) a rake arranged above said guide structure and articulated for movement from a position spaced above said track by a distance sufficient to allow passage of said hocks under sake rake to a position vertically adjacent said track, and further slidably mounted to move horizontally from a position near said slots throat portions to a position near the downward curving portion of said track, (e) means for actuating said rake in response to control signals, and (f) an upwardly convex saddle element adapted to receive said legs and back portion exiting descent from said track end remote from said thrust rod with said legs resting on opposite flanks of said saddle element.

6. Apparatus as recited in claim 5 further including means for generating control signals to indicate the presence of a shackle arriving at the position of said thrust rod.

7. Apparatus as recited in claim 6 wherein said means for generating control signals includes an optical sensor directed across the path of the shackles on said shackle line conveyor.

8. Apparatus as recited in claim 5 further including a vertical guide member having a pair of slots positioned to be a continuation of said pair of generally parallel slots for guiding said legs and back portion onto said upwardly convex saddle element.

9. Apparatus as recited in claim 5 further including means for guiding and forcibly moving said hocks from the generally vertical portion of said generally parallel slots in a descent to said upwardly convex element.

10. Apparatus as recited in claim 9 further including means for generating control signals to indicate the presence of a shackle arriving at the position of said thrust rod.

11. Leg transfer apparatus for dislodging animal carcass portions suspended by their extremities from shackle line conveyor and guiding said animal carcass portions to a proper position on a belt conveyor comprising (a) a thrust rod mounted for linear motion in an upward direction adapted to lift said extremities to release engagement thereof from a shackle, (b) first means for actuating said thrust rod in response to control signals, (c) a guide structure including second means for providing at least one slot having a near end close to said shackle line conveyor and a far end distant from said shackle line conveyor arranged to receive an extremity of said animal carcass portion with an enlarged portion thereof above said slot, at least one edge of said slot being defined by said second means, said slot extending away from said thrust rod n a generally horizontal direction transverse to said shackle line conveyor, said second means being terminated at a position remote from said thrust rod to allow release of an animal carcass portion in a generally vertical downward direction, (d) a rake arranged above said guide structure articulated for movement from a first position spaced above said slot by a distance sufficient to allow passage of said extremity enlarged portion under said rake to a second position immediately above said slot, and further articulated to move horizontally from a position of said slot near end to a position near the termination of said second means, (e) means for actuating movement of said rake in response to control signals, (f) at least one generally vertical rail member positioned below said slots to contact a part of said animal carcass portion to cause an extremity thereof to be advanced farther than the remainder thereof in the course of said extremity passing through said slot, and (g) a saddle element adapted to receive said animal carcass portion exiting downwardly from said guide structure, said saddle element having a slot therein to receive a belt conveyor.

12. Apparatus as recited in claim 11 further including means for generating control signals to indicate the presence of a shackle arriving at the position of said thrust rod.

13. Apparatus as recited in claim 12 wherein said means for generating control signals includes an optical sensor directed across the path of the shackles on said shackle line conveyor.

14. Apparatus as recited in claim 11 further including a vertical guide member having at least one generally vertical slot positioned to be a continuation of said at least one slot for guiding said legs and back portion onto said upwardly convex element.

15. Apparatus as recited in claim 11 further including means for guiding and forcibly moving said extremity enlarged portions from the generally horizontally extending portion of said at least one slot in a descent to said saddle element.

16. Apparatus as recited in claim 11 further including a pusher bar reciprocally actuated to slide said animal carcass portion forward on said saddle element and third means for guiding said animal carcass portion down onto said belt conveyor.

17. Leg transfer apparatus for dislodging a bird carcass portion suspended by its hocks from a shackle of a shackle line conveyor and guiding said bird carcass portion to a proper position on a chain belt conveyor of a chicken leg processor machine or the like comprising (a) a thrust rod mounted for linear motion in an upward direction adapted to lift said hocks to release engagement thereof from a shackle, (b) means for actuating said thrust rod in response to control signals, (c) a guide structure including rigid track elements providing generally parallel first and second slots having a near end close to said shackle line conveyor and a far end distant from said shackle line conveyor and spaced apart horizontally between about one to six inches, each arranged to receive a leg of said bird carcass portion with the hock thereof above the respective slot, said first and second slot outer limit each being defined by edges of said track elements, said slots extending away from said thrust rod in a generally horizontal direction transverse to said shackle line conveyor, said track elements being terminated at a position remote from said thrust rod to allow release of a bird carcass portion in a generally vertical downward direction, (d) a rake arranged above said guide structure and articulated for movement from a position spaced above said slots by a distance sufficient to allow passage of said hocks under said rake to a position immediately above said slots, and further articulated to move horizontally from a position at said slots near end to a position more distant from said thrust rod, (e) means for actuating movement of said rake in response to control signals, (f) a spine member positioned below said slots to contact the crotch of said bird carcass portion to cause the hocks thereof to be advanced farther than the remainder thereof in the course of said hocks passing through said slots, and (g) an upwardly convex saddle element adapted to receive said legs and back portion exiting in a gravity fall from said guide structure with said legs on opposite sides of said spine member, said saddle element having a slot therein to receive a toothed chain belt conveyor.

18. Apparatus as recited in claim 17 further including a pusher bar reciprocally actuatable to slide said bird carcass portion forward on said saddle element and a pair of prongs on either side of said saddle element for forcing said bird carcass portion down onto said chain belt conveyor.

19. Apparatus as recited in claim 18 further including a vertical guide, generally vertical third and fourth members, having slots positioned to be a continuation of said generally parallel first and second slots for guiding said legs and back portion onto said saddle element.

20. Leg transfer apparatus for removing the legs and back portion of a bird carcass suspended by its hocks on a shackle of a shackle line conveyor and guiding said legs and back portion to a proper position on a chain belt conveyor of a chicken leg processor machine or the like comprising (a) a thrust rod mounted for linear motion in an upward direction adapted to lift the legs of a bird to release engagement of the hocks thereof from a shackle, (b) means for actuating said thrust rod in response to control signals, (c) a guide structure having a pair of generally parallel slots spaced apart between about one to about six inches, each with a throat portion arranged to receive a respective leg of said bird carcass with the hock thereof above the slot, said pair of slots being adapted to capture said hocks and forming a track extending away from said thrust rod in a generally horizontal direction transverse to said shackle line conveyor and curving to a generally vertical downwardly directed at a portion remote from said thrust rod, (d) a first rake arranged above said guide structure and articulated for movement from a position spaced above said track by a distance sufficient to allow passage of said hocks under said rake to a position vertically adjacent said track, and further slidably mounted to move horizontally from a position near said slots throat portions to a position near the downwardly directed portion of said track, (e) means for actuating said first rake in response to control signals.

(f) a second rake arranged for slidable, generally vertical movement along the downwardly directed portion of said track, (g) means for actuating said second rake in response to completed horizontal movement of said first rake, and (h) an upwardly convex saddle element adapted to receive said legs and back portion exiting the downwardly curving part of said track with said legs resting on opposite flanks of said saddle element.

* * * * *